US012690054B2

(12) United States Patent
Zhang et al.

(10) Patent No.: US 12,690,054 B2
(45) Date of Patent: Jul. 21, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 353 days.

(21) Appl. No.: 18/374,733

(22) Filed: Sep. 29, 2023

(65) Prior Publication Data

US 2024/0032072 A1    Jan. 25, 2024

Related U.S. Application Data

(63) Continuation of application No. PCT/CN2021/093099, filed on May 11, 2021.

(30) Foreign Application Priority Data

Apr. 1, 2021    (WO) ................ PCT/CN2021/085082

(51) Int. Cl.
*H04W 72/23*    (2023.01)
*H04W 72/1273*    (2023.01)
(Continued)

(52) U.S. Cl.
CPC ....... *H04W 72/30* (2023.01); *H04W 72/1273* (2013.01); *H04W 72/232* (2023.01)

(58) Field of Classification Search
CPC ............. H04W 72/1273; H04W 72/30; H04W 72/232; H04W 72/0453; H04L 5/0044; H04L 5/0092
See application file for complete search history.

(56) References Cited

U.S. PATENT DOCUMENTS

2018/0278454 A1*    9/2018    Islam .................... H04L 1/0038
2019/0364558 A1    11/2019    Kim et al.
(Continued)

FOREIGN PATENT DOCUMENTS

CN    101883325 A    11/2010
CN    104272826 A    1/2015
(Continued)

OTHER PUBLICATIONS

International Search Report and Written Opinion dated Jan. 4, 2022 in International Application No. PCT/CN2021/0930990. English translation attached.

(Continued)

*Primary Examiner* — Andrew Lee

(74) *Attorney, Agent, or Firm* — Sheppard, Mullin, Richter & Hampton LLP

(57)    ABSTRACT

Embodiments of the present disclosure provide a wireless communication method, a terminal device, and a network device. The method includes: receiving a common Physical Downlink Control Channel (PDCCH) on at least one Multimedia Broadcast Service Bandwidth Part (MBS BWP) associated with an active dedicated unicast BWP, the MBS BWP being a Common Frequency Resource (CFR) for MBS, and each of the at least one MBS BWP having a frequency domain range within a frequency domain range of the active dedicated unicast BWP; and receiving a common Physical Downlink Shared Channel (PDSCH) scheduled by the common PDCCH. The method provided by the embodiments of the present disclosure may avoid a delay caused by the terminal device due to BWP switching during the MBS process, and may ensure detection of the common PDCCH without improving the PDCCH detection capability of the terminal device.

18 Claims, 5 Drawing Sheets

200

Terminal Device

Network Device

S210, Receive a common Physical Downlink Control Channel (PDCCH) on at least one Multimedia Broadcast Service Bandwidth Part (MBS BWP) associated with an active dedicated unicast BWP, the at least one MBS BWP being a Common Frequency Resource (CFR) for MBS, and each of the at least one MBS BWP having a frequency domain range within a frequency domain range of the active dedicated unicast BWP S220, Receive a common Physical Downlink Shared Channel (PDSCH) scheduled by the common PDCCH

(51) Int. Cl.
*H04W 72/232* (2023.01)
*H04W 72/30* (2023.01)

(56) References Cited

U.S. PATENT DOCUMENTS

| | | | | |
|---|---|---|---|---|
| 2019/0394757 | A1* | 12/2019 | Zhang | H04B 7/0452 |
| 2020/0077427 | A1* | 3/2020 | Li | H04L 1/0067 |
| 2022/0053470 | A1* | 2/2022 | Chen | H04L 1/0061 |
| 2022/0232658 | A1* | 7/2022 | Chen | H04L 5/0096 |
| 2022/0303892 | A1* | 9/2022 | Awadin | H04W 52/0229 |
| 2022/0330060 | A1* | 10/2022 | Awadin | H04B 7/06964 |
| 2023/0156741 | A1* | 5/2023 | Fu | H04L 5/001 |
| | | | | 370/329 |
| 2023/0354382 | A1* | 11/2023 | Liu | H04W 4/06 |
| 2024/0014926 | A1* | 1/2024 | Li | H04L 1/0075 |
| 2024/0089704 | A1* | 3/2024 | Shrivastava | H04W 72/0453 |
| 2024/0324068 | A1* | 9/2024 | Shrivastava | H04W 52/0229 |

FOREIGN PATENT DOCUMENTS

| | | | |
|---|---|---|---|
| CN | 106031200 | A | 10/2016 |
| CN | 111034340 | A | 4/2020 |
| CN | 111226486 | A | 6/2020 |
| WO | 2020121414 | A1 | 6/2020 |
| WO | 2022082715 | A | 4/2022 |

OTHER PUBLICATIONS

International Search Report and Written Opinion dated Jul. 29, 2021 in International Application No. PCT/CN2021/085082. English translation attached.

OPPO,Group scheduling for NR Multicast and Brondenst ServicesR1-2100344,Jan. 18, 2021 (Jan. 2021—18sections 1-2.

RAN1 "Chairman's Notes " Chairman's Notes RAN/#104-e final, Mar. 2021 (Mar. 4, 2021) section 8.12.

"3rd Generation Partnership Project; Technical Specification Group Radio Access Network;NR;Physical layer procedures for control (Release 16)" 3GPP TS 38.213 V16.4.0, Dec. 2020, Section 10.

"3rd Generation Partnership Project; Technical Specification Group Radio Access Network;NR;Radio Resource Control (RRC) protocol specification (Release 16)" 3GPP TS 38.331 V16.2.0 Jan. 2021,Section 6.3.2.

Extended European search report issued by the EPO for Application No. EP21934221.9 dated Aug. 7, 2024.

CMCC, "Discussion on group scheduling mechanisms in NR MBS", 3GPP TSG RAN WG1#102-e, R1-2006233, e-Meeting, Aug. 17-28, 2020, Aug. 7, 2020.

Vivo, "Discussion on mechanisms to support group scheduling for RRC-CONNECTED UEs", 3GPP TSG RAN WG1 #104-e, R1-2100469, e-Meeting, Jan. 25-Feb. 5, 2021, Jan. 18, 2021.

Samsung, "On mechanisms to support group scheduling for RRC_CONNECTED UEs", 3GPP TSG RAN WG1 #104-e, R1-2101234, e-Meeting, Jan. 25-Feb. 5, 2021, Jan. 19, 2021.

* cited by examiner

100

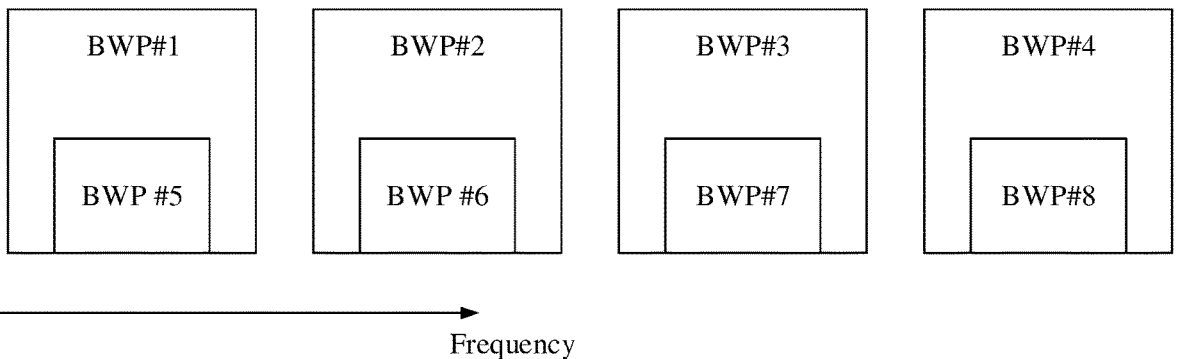
Frequency
FIG. 10
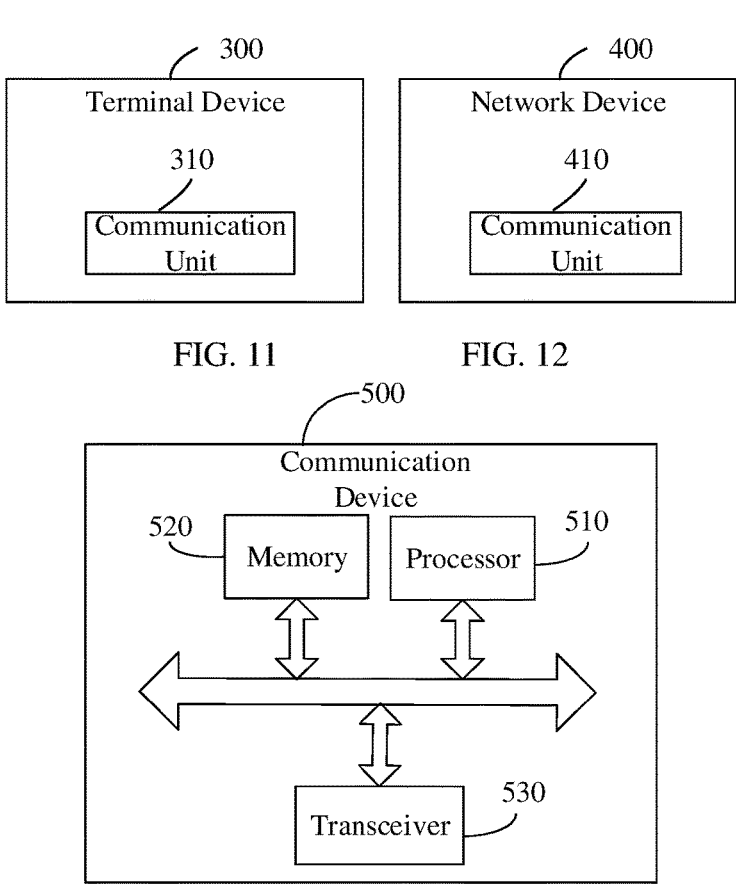
FIG. 11        FIG. 12
FIG. 13

WIRELESS COMMUNICATION METHOD, TERMINAL DEVICE, AND NETWORK DEVICE

CROSS-REFERENCE TO RELATED APPLICATIONS

This application is a continuation of International Application No. PCT/CN2021/093099 filed on May 11, 2021, which claims priority to International Patent Application No. PCT/CN2021/085082 filed on Apr. 1, 2021, the entire disclosure of which is incorporated herein by reference.

TECHNICAL FIELD

The embodiments of the present disclosure relate to the field of communication, and more particularly, to a wireless communication method, a terminal device, and a network device.

BACKGROUND

New Radio (NR) Multimedia Broadcast Service (MBS) needs to support one-to-multiple multicast transmission. In such a transmission mode, a base station needs to schedule a common Physical Downlink Shared Channel (PDSCH) by transmitting a common Physical Downlink Control Channel (PDCCH). The common PDCCH and the common PDSCH are transmitted over a range of Common Frequency Resource (CFR).

However, in the NR MBS, there is no relevant technical solution as for how to configure the CFR in the related art. In addition, after the introduction of the MBS, there is no technical solution currently as for how to ensure the reception of MBS and Unicast without improving Downlink Control Information (DCI) detection capability of the terminal.

SUMMARY

In an aspect, the present disclosure provides a wireless communication method, including:

receiving a common Physical Downlink Control Channel (PDCCH) on at least one Multimedia Broadcast Service Bandwidth Part (MBS BWP) associated with an active dedicated unicast BWP, the at least one MBS BWP being a Common Frequency Resource (CFR) for MBS, and each of the at least one MBS BWP having a frequency domain range within a frequency domain range of the active dedicated unicast BWP; and receiving a common Physical Downlink Shared Channel (PDSCH) scheduled by the common PDCCH.

In an aspect, the present disclosure provides a terminal device, including a processor, and a memory having a computer program stored thereon. The processor is configured to invoke and execute the computer program stored in the memory, to: receive a common Physical Downlink Control Channel (PDCCH) on at least one Multimedia Broadcast Service Bandwidth Part (MBS BWP) associated with an active dedicated unicast BWP, the at least one MBS BWP being a Common Frequency Resource (CFR) for MBS, and each of the at least one MBS BWP having a frequency domain range within a frequency domain range of the active dedicated unicast BWP; and receive a common Physical Downlink Shared Channel (PDSCH) scheduled by the common PDCCH.

In an aspect, the present disclosure provides a network device, including a processor, and a memory having a computer program stored thereon. The processor is configured to invoke and execute the computer program stored in the memory, to: transmit a common Physical Downlink Control Channel (PDCCH) on at least one Multimedia Broadcast Service Bandwidth Part (MBS BWP) associated with an active dedicated unicast BWP, the at least one MBS BWP being a Common Frequency Resource (CFR) for MBS, and each of the at least one MBS BWP having a frequency domain range within a frequency domain range of the active dedicated unicast BWP; and transmit a common Physical Downlink Shared Channel (PDSCH) scheduled by the common PDCCH.

BRIEF DESCRIPTION OF DRAWINGS

FIG. 7 is a schematic flowchart of a wireless communication method provided by an embodiment of the present disclosure;

FIG. 8 to FIG. 10 are examples of an association relationship between a terminal-dedicated unicast BWP and an MBS BWP provided by embodiments of the present disclosure;

FIG. 11 is a schematic block diagram of a terminal device provided by an embodiment of the present disclosure;

FIG. 12 is a schematic block diagram of a network device provided by an embodiment of the present disclosure;

FIG. 13 is a schematic block diagram of a communication device provided by an embodiment of the present disclosure.

DESCRIPTION OF EMBODIMENTS

The technical solutions of the embodiments of the present disclosure will be described below in conjunction with the drawings of the embodiments of the present disclosure. Obviously, the embodiments described are part, but not all, of the embodiments of the present disclosure. Based on the embodiments in the present disclosure, all other embodiments that can be obtained by the skilled in the art without any inventive labor also fall into the protection scope of the present disclosure.

Figure 1:
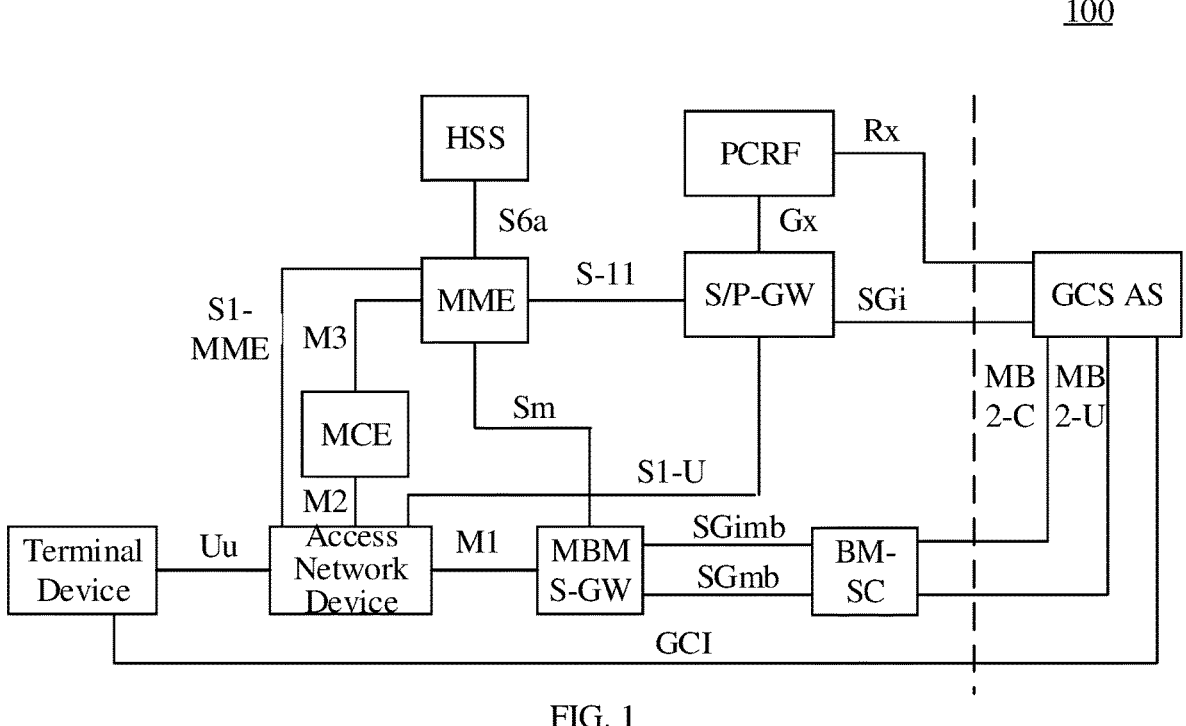
FIG. 1 is an example of a system architecture of the present disclosure.

FIG. 1 is an example of a system architecture of the present disclosure.

As shown in FIG. 1, the system architecture 100 may include: a terminal device, an access network device, a Multi-cell/multicast Coordination Entity (MCE), a Mobility Management Entity (MME), a HOME Subscriber Server (HSS), a Policy and Charging Rules Function (PCRF), a Service/PDN Gateway (S/P-GW), a Group Communication Service Application Server (GCS AS), a Broadcasting Multicast Service Centers (BM-SC), and a Multimedia Broadcast Multicast Service Gateway (MBMS-GW).

The respective nodes or network elements in the system architecture 100 may be communicated with each other. For example, the respective nodes or network elements in SC-PTM100 may be communicated with each other via various types of interfaces.

For example, the terminal device may communicate with the access network device via a UU interface; the access network device may communicate with the MCE via an M2 interface, with the MME via an S1-MME interface, with the MBMS-GW via an M1 interface, and with the S/P-GW via an S1-U interface; the MCE may communicate with the MME via an M3 interface; the MME may communicate with the HSS via an S6a interface, with the S/P-GW via an S-11 interface, and with MBMS-GW via an Sm interface; the S/P-GW may communicate with the GCS AS via an SGI interface, and with the PCRF with a Gx interface; the PCFR may communication with the GCS AS with an Rx interface; the GCS AS may communicate with the BM-SC via an MB2-C interface and an MB2-Y interface; and the BM-SC may communicate with an SGmb and the MBMS-GW via an SGimb interface.

It should be understood that the above interfaces involved may be interfaces specified or defined in the communication standards, in order to realize the transmission of data or signaling among respective nodes or network elements.

It should be noted that particular implementations of the above nodes or network elements are not limited by the present disclosure.

For example, the access network device may be an evolutional base station (eNB or eNodeB) in the Long Term Evolution (LTE) system, or a Next Generation Radio Access Network (NG RAN) device, or a base station (gNB) in the NR system, or a wireless controller in a Cloud Radio Access Network (CRAN), or the network device 120 may be a relay station, an access node, a vehicle-mounted device, a wearable device, a hub, a switch, a bridge, a router, or a network device in a future evolved Public Land Mobile Network (PLMN).

For another example, the terminal device may be any terminal device, including but not limited to, a terminal device connected to the network device 120 or other terminal devices by wire or wirelessly. For example, the terminal device may refer to an access terminal, a User Equipment (UE), a user unit, a user station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network, or a terminal device in the future evolved PLMN, etc. For another example, the terminal device may be used for Device to Device (D2D) communication.

As an example, the system architecture 100 may be a Single Cell Point To Multiploint (SC-PTM). The SC-PTM may be based on a Multimedia Broadcast Multicast Service (MBMS) network architecture.

The MBMS is a service introduced in 3rd Generation Partnership Project (3GPP) Release 6. The MBMS is a technology that transmits data from one data source to a plurality of UEs via shared network resources, which may effectively utilize network resources while providing multimedia service, achieving higher-speed (256 kbps) multimedia service broadcast and multicast.

Since a spectrum efficiency of the MBMS in 3GPP R6 is relatively low, it is not enough to effectively carry and support operation of a mobile phone or TV type of services. Therefore, in the Long Term Evolution (LTE) project, 3GPP proposes to enhance the support capabilities for downlink high-speed MBMS service, and determines the design requirements for physical layers and air interfaces.

E-MBMS is introduced to the LTE network in R9. The E-MBMS proposes the concept of Single Frequency Network (SFN), that is, transmitting data in all of cells at the same time using a unified frequency, but the synchronization among the cells should be guaranteed. This method may greatly improve the overall Signal-Noise Ratio (SNR) distribution of the cell, and the spectrum efficiency may be greatly improved accordingly. The broadcast and multicast of the services may be implemented based on Internet Protocol (IP) multicast protocols.

In R13, the SC-PTM is introduced. The SC-PTM is based on the MBMS network architecture. Alternatively, the reception of the MBMS service is applicable to the UE in an RRC_CONNECTED or RRC_IDLE state. Alternatively, the Multi-Cell/multicast Coordination Entity (MCE) decides whether to use an SC-PTM transmission mode or a Multimedia Broadcast multicast service Single Frequency Network (MBSFN) transmission mode.

Figure 2:
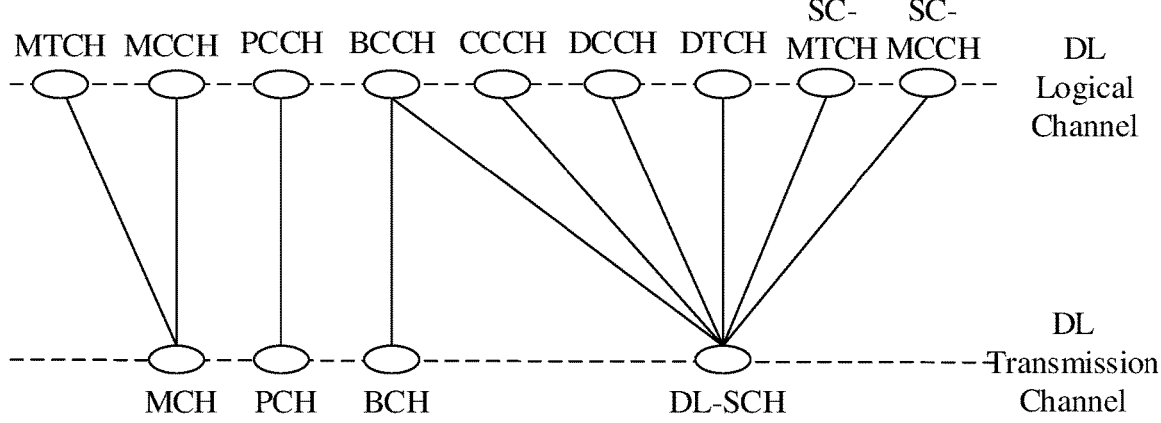
FIG. 2 is a schematic diagram of a mapping relationship between a logical channel and a transmission channel provided by an embodiment of the present disclosure.

FIG. 2 is a schematic diagram of a logical channel and a physical channel of SC-PTM provided by an embodiment of the present disclosure.

As shown in FIG. 2, a downlink logical channel may include a Single Cell Multicast Control Channel (SC-MCCH) and a Single Cell Multicast Transport Channel (SC-MTCH). For example, a Logical Channel Identifier (LCID) of the SC-MCCH is 11001, and a LCID of the SC-MTCH is 11001. Both the SC-MCCH and the SC-MTCH may be mapped to a Downlink Shared Channel (DL-SCH), such as a Physical Downlink Shared Channel (PDSCH). Alternatively, the SC-MCCH and the SC-MTCH do not support a Hybrid Automatic Repeat reQuest (HARQ) operation.

In addition, as shown in FIG. 2, the downlink logical channel may further include at least one of: a Multicast Control Channel (MCCH), a Multicast Transport Channel (MTCH), a Paging Control Channel (PCCH), a Common Control Channel (CCCH), a Dedicated Control Channel (DCCH), a Broadcast Control Channel (BCCH), or a Dedicated Traffic Channel (DTCH). In addition, the downlink transmission channel may further include at least one of: a Broadcast Channel (BCH), a Paging Channel (PCH), or a Multicast Channel (MCH).

In addition, configuration information of the SC-MCCH may be carried in a System Information Block (SIB). For example, SIB20 may include configuration information of the SC-MCCH. Alternatively, one cell has only one SC-MCCH. The configuration information may include: a modification period and a repetition period of SC-MCCH, a radio frame and subframe configuration information. Alternatively, the radio frame scheduled by the SC-MCCH: SFN mod MCCH repetition period (mcch-RepetitionPeriod) =MCCH offset (mcch-Offset). Alternatively, the subframe scheduled by the SC-MCCH is indicated by sc-mcch-Subframe. Alternatively, the SC-MCCH transmits only one message, that is, SCPTM configuration (SCPTMConfiguration), which is used to configure configuration information of the SC-PTM. Alternatively, a new Radio Network Temporary Identifier (RNTI), such as a Single Cell RNTI (SC-RNTI) (with a fixed value FFFC), may be introduced to identify scheduling information of the SC-MCCH on the PDCCH. Alternatively, a new RNTI, such as a Single Cell Notification RNTI (SC-N-RNTI) (with a fixed value FFFB), may be introduced to identify the PDCCH of the SC-MCCH modification notification. Alternatively, the modification period of the SC-MCCH may indicate a modification notification with one (bit) of 8 bits in DCI 1C. Alternatively, a boundary of the modification period may be defined as SFN mod m=0, where m is the modification period (sc-mcch-ModificationPeriod) configured in the SIB20.

Figure 3:
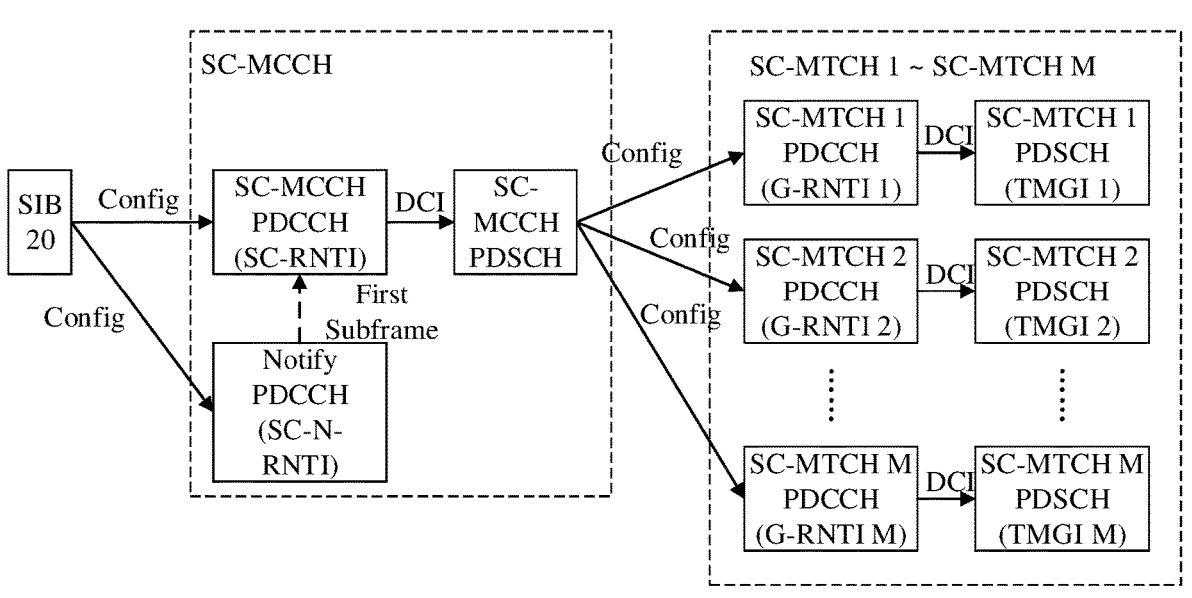
FIG. 3 is a schematic diagram of a configuration transmission mechanism provided by an embodiment of the present disclosure.

FIG. 3 is a schematic diagram of a configuration transmission mechanism provided by an embodiment of the present disclosure.

As shown in FIG. 3, SIB20 may configure (Config) the SC-MCCH PDCCH, and may also configure the notification PDCCH. Alternatively, the SC-MCCH PDCCH may be scrambled by a Single Cell RNTI (SC-RNTI), and/or the notification PDCCH may be scrambled by a Single Cell Notification RNTI (SC-N-RNTI). The Downlink Control Information (DCI) in the SC-MCCH PDCCH may be used to schedule an SC-MCCH PDSCH. The SC-MCCH PDSCH may configure (Config)SC-MTCH 1~SC-MTCH M, the SC-MTCH 1~SC-MTCH M may include SC-MTCH 1 PDCCH-SC-MTCH M PDCCH, and DCI in SC-MTCH 1 PDCCH-SC-MTCH M PDCCH may be used to schedule SC-MTCH 1 PDSCH-SC-MTCH M PDSCH. Alternatively, the SC-MTCH 1 PDCCH-SC-MTCH M PDCCH may be respectively scrambled by Group RNTI (G-RNTI) 1~G-RNTI M. Alternatively, the SC-MTCH 1 PDSCH-SC-MTCH M PDSCH may carry Temporary Mobile Group Identifier (TMGI) 1~TMGI M, respectively.

With people's pursuit of rate, delay, high-speed mobility, energy efficiency, and diversity and complexity of services in future life, the 3GPP International Standard Organization has begun to develop 5G. The main application scenarios of 5G include: Enhance Mobile Broadband (eMBB), Ultra-Reliable and Low Latency Communication (URLLC), Massive Machine Type of Communication (mMTC), etc. The eMBB aims at users' access to multimedia content, services and data, requirements for which are growing rapidly. Since the eMBB may be deployed in different scenarios, such as indoors, urban areas, rural areas, there are relatively large differences in its capabilities and requirements, which cannot be treated generally, but may be analyzed in detail in conjunction with particular deployment scenarios. Typical applications of the URLLC include: industrial automation, power automation, telemedicine operations (surgery), traffic safety assurance, etc. Typical characteristics of the mMTC include: high connection density, small data volume, delay-insensitive services, low cost and long service life of modules, etc.

In the 5G network environment, in order to reduce air interface signaling, quickly restore wireless connections, and quickly restore data services, a new Radio Resource Control (RRC) state, i.e., RRC_INACTIVE state, is defined. This state is different from the RRC_IDLE state and the RRC_CONNECTED state.

In the RRC_IDLE state, the mobility is UE-based cell selection and reselection, paging is initiated by a Core Network (CN), and a paging area is configured by the CN. There is no UE Access Stratum (AS) context and no RRC connection at the base station side.

In the RRC_CONNECTED state, there is an RRC connection, and there is UE AS context at the base station and the UE. The network device knows the location of the UE at a specific cell level. The mobility is mobility controlled by the network device. Unicast data may be transmitted between the UE and the base station.

In the RRC_INACTIVE state, the mobility is UE-based cell selection and reselection, there is a connection between CN and NR, there is UE AS context at a certain base station, paging is triggered by the Radio Access Network (RAN), a RAN-based paging area is managed by the RAN, and the network device knows the location of the UE at the RAN-based paging area level.

In 5G, the maximum channel bandwidth may be 400 MHZ (wideband carrier), which is very large compared to the maximum 20M bandwidth of LTE. If the UE remains operating on the wideband carrier, the power consumption of the UE is increased. The power consumption of the UE may be optimized by the BandWidth Part (BWP). That is, the Radio Frequency (RF) bandwidth of the UE may be adjusted according to the actual throughput of the UE. Another purpose of the BWP is to trigger coexistence of a plurality of air interface Numerologies in a cell. The UE in the idle state or inactive state resides on the initial BWP. This BWP is visible to the UE in the idle state or inactive state. Information, such as Master Information Block (MIB), Remaining Minimum System Information (RMSI), Other System Information (OSI), and paging, may be obtained from this BWP.

Figure 4:
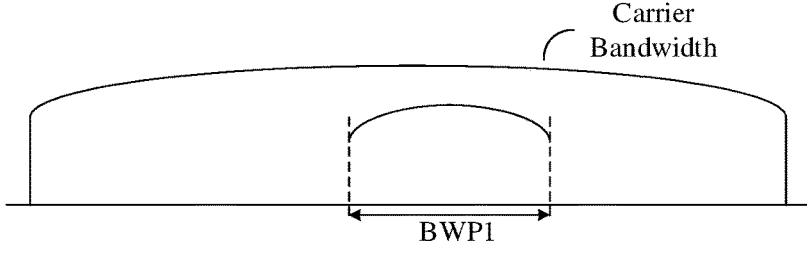
FIG. 4 to FIG. 6 are schematic block diagrams of a BWP of a terminal device provided by embodiments of the present disclosure.
Figure 5:
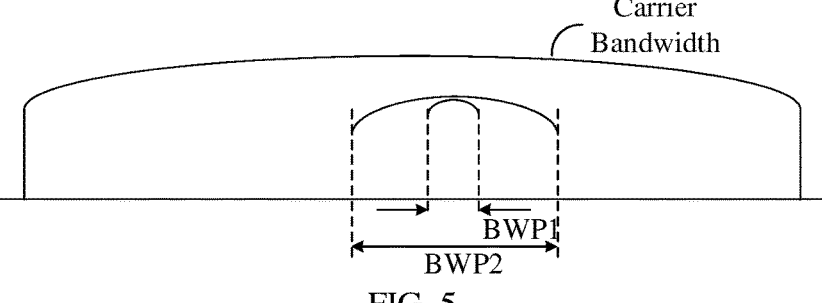
Figure 6:
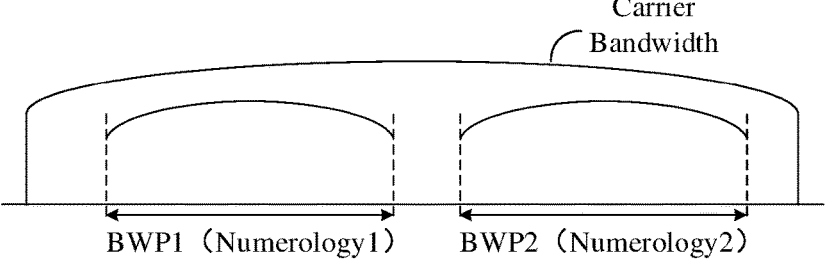

FIG. 4 to FIG. 6 are schematic block diagrams of a BWP of a terminal device according to embodiments of the present disclosure.

For example, as shown in FIG. 4, if the rate of the UE is lower, a part of the carrier bandwidth, such as BWP1, may be configured for the UE. For another example, as shown in FIG. 5, if the UE has higher requirements on the rate, a larger BWP, e.g., BWP2 larger than BWP1, may be configured for the UE. For yet another example, as shown in FIG. 6, if the UE supports a high rate or works in a Carrier Aggregation (CA) mode, a plurality of BWPs, such as BWP1 and BWP2, may be configured for the UE. Alternatively, BWP1 and BWP2 may correspond to air interface Numerology 1 and air interface Numerology 2, respectively.

One UE may be configured with up to 4 UL BWPs and up to 4 DL BWPs via RRC dedicated signaling, but only one DL BWP and one UL BWP may be activated at the same time. The first active BWP among the configured BWPs may be indicated in the RRC dedicated signaling. Meanwhile, when the UE is in the connected state, it may also switch between different BWPs via DCI. When a carrier in the inactive state enters the active state, the first active BWP is the first active BWP configured in the RRC. Configuration parameters of each BWP include at least one of:

a subcarrier spacing (subcarrierSpacing);

a cyclic prefix (cyclicPrefix);

the first PRB of the BWP and the number of consecutive PRBs (locationAndBandwidth);

a BWP identifier (bwp-Id); or a BWP common configuration parameter (bwp-Common) and dedicated configuration parameter (bwp-Dedicated).

Exemplarily, values of the BWP id in the RRC signaling may be 0 to 4, where 0 is the initial BWP by default.

A BWP indicator in DCI is 2 bits. If the number of configured BWPs is smaller than or equal to 3, the BWP indicator may be 1, 2 or 3, and the BWP indicator 1, 2 and 3 correspond to BWP id 1, 2 and 3, respectively. If the number of BWPs is equal to 4, the BWP indicator may be 0, 1, 2, and 3. Alternatively, the BWP indicators 0, 1, 2, and 3 respectively correspond to BWPs configured according to sequential indexes. Alternatively, consecutive BWP ids are used when configuring BWP.

Generally, the UE in the idle state or the inactive state resides on the initial BWP. This initial BWP is visible to the UE in the idle state or the inactive state. The information, such as MIB, RMSI, OSI, and paging, may be obtained from the initial BWP.

In order to facilitate the understanding of the technical solutions of the present disclosure, the configuration of the downlink BWP is described below.

The downlink BWP may be configured by a downlink BWP (BWP-Downlink) parameter, a downlink BWP common (BWP-DownlinkCommon) parameter, and a downlink BWP indication (BWP-DownlinkDedicated) parameter.

The BWP-Downlink parameter may be shown in the first paragraph of ASN.1 codes below.

The first paragraph of ASN.1 codes:

```
BWP-Downlink ::=            SEQUENCE {
    bwp-Id                  BWP-Id,
    bwp-Common              BWP-DownlinkCommon
    OPTIONAL,   -- Cond SetupOtherBWP
    bwp-Dedicated           BWP-DownlinkDedicated
    OPTIONAL,   -- Cond SetupOtherBWP
    ...
}
```

As shown in the first paragraph of ASN.1 codes, the BWP-Downlink parameter includes a bwp-Id parameter and a bwp-Common parameter. The bwp-Id parameter is used to identify the ID of the current BWP, and the bwp-Common parameter is used to configure BWP-DownlinkCommon of the downlink BWP. For a dedicated unicast BWP of a terminal device, the bwp-Dedicated parameter in the BWP-Downlink parameter will configure a downlink reception parameter on the downlink BWP, that is, the downlink BWP indication (BWP-DownlinkDedicated) parameter.

The BWP-DownlinkCommon parameter may be shown in the second paragraph of ASN.1 codes below.

The second paragraph of ASN.1 codes:

```
BWP-DownlinkCommon ::=      SEQUENCE {
    genericParameters       BWP,
    pdcch-ConfigCommon      SetupRelease { PDCCH-ConfigCommon }
    OPTIONAL,   -- Need M
    pdsch-ConfigCommon      SetupRelease { PDSCH-ConfigCommon }
    OPTIONAL,   -- Need M
    ...
}
```

As shown in the second paragraph of ASN.1 codes, genericParameters in the BWP-DownlinkCommon parameter is used to configure the start point in frequency domain and the number of PRBs included in the downlink BWP. The pdcch-ConfigCommon parameter in the BWP-DownlinkCommon parameter is used to indicate the common configuration parameter of the PDCCH on the downlink BWP, and the pdsch-ConfigCommon parameter in the BWP-DownlinkCommon parameter is used to indicate the common configuration parameter of the PDSCH on the downlink BWP.

For example, the BWP-DownlinkDedicated parameter may be shown in the third paragraph of ASN.1 codes below.

The third paragraph of ASN.1 codes:

```
BWP-DownlinkDedicated ::=       SEQUENCE {
    pdcch-Config                SetupRelease { PDCCH-Config }
    OPTIONAL,   -- Need M
    pdsch-Config                SetupRelease { PDSCH-Config }
    OPTIONAL,   -- Need M
    sps-Config                  SetupRelease { SPS-Config }
    OPTIONAL,   -- Need M
    radioLinkMonitoringConfig   SetupRelease { RadioLinkMonitoringConfig }
    OPTIONAL,   -- Need M
    ...
}
```

As shown in the third paragraph of ASN.1 codes, the BWP-DownlinkDedicated parameter includes at least the pdcch-Config parameter, the pdsch-Config parameter, and the sps-Config parameter, and the sps-Config parameter is used to indicate the SPS configuration on the downlink BWP, the pdcch-Config parameter is used to indicate the PDCCH transmission mode on the downlink BWP, and the pdsch-Config parameter is used to indicate the PDSCH transmission mode on the downlink BWP.

In NR MBS, it is necessary to support one-to-multiple multicast transmission. In this transmission mode, the base station needs to schedule a common PDSCH by transmitting a common downlink control channel. The common PDCCH and the common PDSCH are transmitted in a common frequency domain range, i.e., Common Frequency Resource, (CFR).

In some embodiments, the CFR configuration methods may include two types:

Type 1, in which the CFR may be configured as an MBS-dedicated BWP, which is associated with the terminal-dedicated unicast BWP, and the subcarrier spacing and cyclic prefix configured on the CFR are respectively identical with the subcarrier spacing and the cyclic prefix configured on the terminal-dedicated unicast BWP.

Type 2, in which the CFR may configured as a plurality of consecutive PRBs within the range of the terminal-dedicated unicast BWP.

The advantages of the first type of method consist in that the CFR may follow the existing BWP signaling configuration, which facilitates to reduce the workload of the Standards. However, the problem is that since the CFR is defined as BWP, if the terminal is required to receive unicast in the dedicated unicast BWP and to receive multicast within the CFR at the same time, which means that the terminal needs to receive downlink transmissions on those two BWPs at the same time, the terminal only can receive downlink transmissions on one BWP at a certain moment. In addition, even if the terminal receives the unicast and the multicast at different times, a BWP switching delay may be introduced because the unicast and the multicast are located in different BWPs. The second type of method may avoid the problem of BWP switching. However, since the CFR is configured as a plurality of consecutive PRBs, the current BWP-based signaling configuration cannot be followed, and the resource range of the CFR and the uplink and downlink transmission parameters need to be redesigned, which would bring a more significant modification to the Standards.

In addition, since the common PDCCH scheduling the common PDSCH needs to be transmitted to a plurality of receiving terminals at the same time, in order to ensure that the number of bits of common DCI carried in the common PDCCH determined by the plurality of terminals is the same, the terminals cannot determine the number of bits of the common DCI according to their respective dedicated unicast BWP configurations. In addition, since the number of PRBs of the CFR may be different from that of the initial BWP or Control Resource SET 0 (CORESET #0) currently configured by the terminal, the terminal cannot determine the number of bits of the common DCI from the initial BWP or CORESET #0. Inevitably, the number of bits of the common DCI may thus be different from the number of bits of DCI received by the terminal in the USS or CSS. Then, in order to reduce the implementation complexity of the terminal, the terminal may only receive up to 4 DCIs with different numbers of bits in one cell currently, and DCI with the number of bits scrambled by the C-RNTI does not exceed 3.

Therefore, the present disclosure has further improved the NR MBS system. More particularly, how to configure the CFR used to transmit the common PDCCH and the common PDSCH, and how the terminal detects the common PDCCH scheduling the common PDSCH in the CFR are problems to be solved in the present disclosure.

Figures 7, 8, 9:
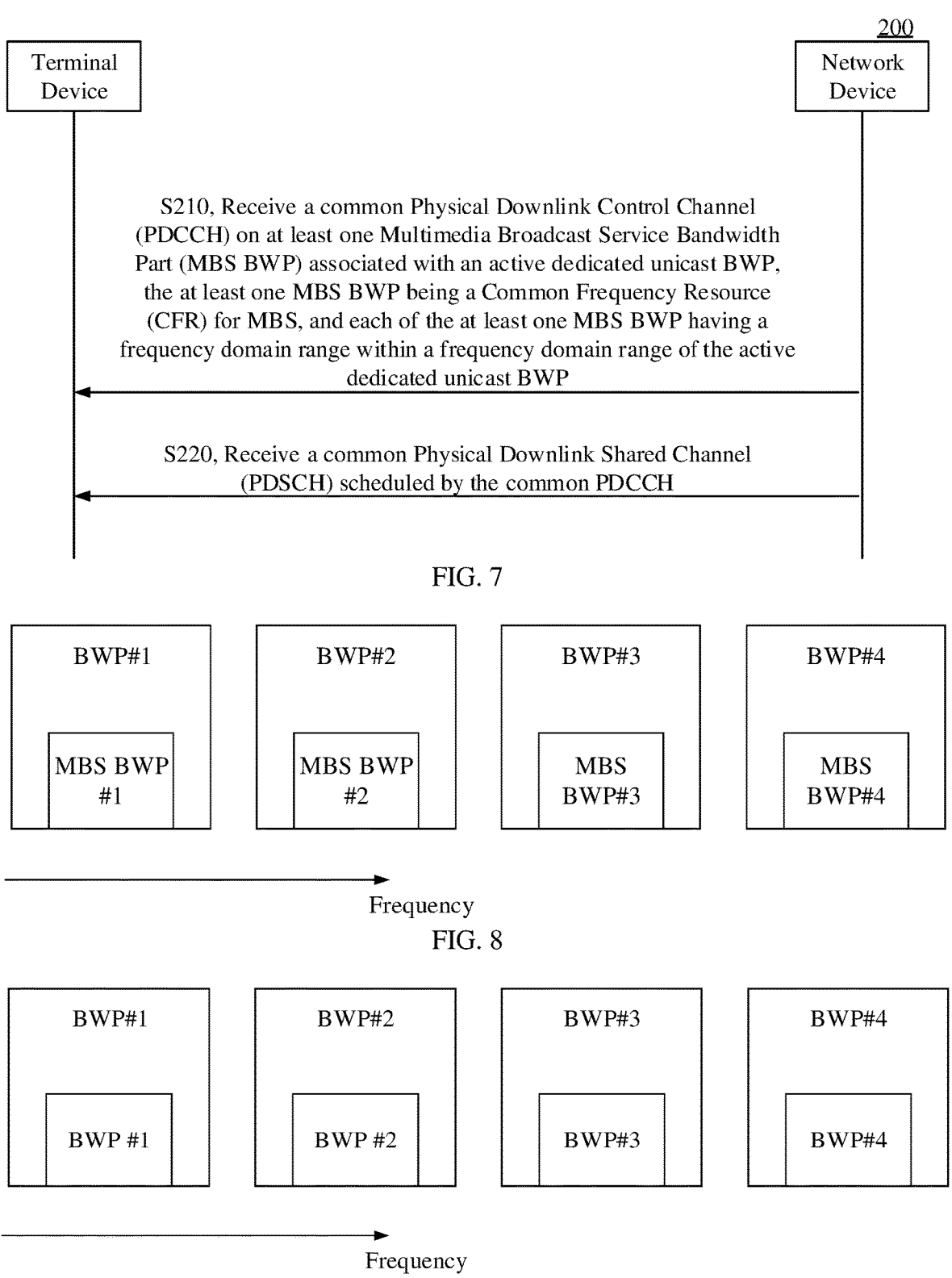

FIG. 7 shows a schematic flowchart of a wireless communication method 200 according to an embodiment of the present disclosure, which may be performed interactively by a terminal device and a network device. The terminal device shown in FIG. 7 may be the terminal device as shown in FIG. 1, and the network device shown in FIG. 7 may be the access network device as shown in FIG. 1.

As shown in FIG. 7, the method 200 may include part or all of:

S210 of receiving a common Physical Downlink Control Channel (PDCCH) on at least one Multimedia Broadcast Service Bandwidth Part (MBS BWP) associated with an active dedicated unicast BWP, wherein the at least one MBS BWP is a Common Frequency Resource (CFR) for MBS, and a frequency domain range of each of the at least one MBS BWP is arranged within a frequency domain range of the active dedicated unicast BWP; and S220 of receiving a common Physical Downlink Shared Channel (PDSCH) scheduled by the common PDCCH.

In other words, the terminal device receives the common PDCCH transmitted by the network device on at least one MBS BWP associated with the active dedicated unicast BWP, and receives the common PDSCH scheduled by the common PDCCH transmitted by the network device. For example, the CFR is configured as BWP by the dedicated RRC signaling of the terminal device.

In an embodiment of the present disclosure, the common PDCCH is received on at least one MBS BWP associated with the active dedicated unicast BWP. On one hand, the at least one MBS BWP is designed as common CFR for MBS, which is equivalent to that the CFR may follow the current BWP signaling configuration, which facilitates to reduce the workload of the Standards. On the other hand, the frequency domain range of each of the at least one MBS BWP is designed to be arranged within the frequency domain range of the active dedicated unicast BWP, which may avoid the delay caused by the terminal device due to BWP switching during the MBS process, and may ensure detection of the common PDCCH without improving PDCCH detection capability of the terminal.

It should be noted that, in the embodiments of the present disclosure, each BWP serving as the CFR, i.e., the MBS BWP, may be associated with one or more dedicated unicast BWPs of the terminal device, which is not limited in the embodiments of the present disclosure. In other words, an MBS BWP of the at least one MBS BWP may also be associated to a dedicated unicast BWP other than the active dedicated unicast BWP(s).

In some embodiments, the network device is used to configure a terminal device with at least one dedicated unicast BWP, each of the at least one dedicated unicast BWP is associated with one or more MBS BWPs, and the at least one dedicated unicast BWP includes the active dedicated unicast BWP. In other words, the terminal device is configured with the at least one dedicated unicast BWP.

In an implementation, the MBS BWP associated with the at least one dedicated unicast BWP is not used as an active BWP; and/or the terminal device does not expect physical layer signaling and/or Radio Resource Control (RRC) layer signaling to activate the MBS BWP associated with the at least one dedicated unicast BWP.

In an implementation, the MBS BWP associated with the at least one dedicated unicast BWP is not counted in the total number of BWPs configured to the terminal device.

In some embodiments, a subcarrier spacing and a cyclic prefix configured for the at least one MBS BWP are respectively identical with a subcarrier spacing and a cyclic prefix configured for the active dedicated unicast BWP.

In other words, the subcarrier spacing and the cyclic prefix configured on the BWP serving as the CFR are respectively identical with the subcarrier spacing and the cyclic prefix associated with the terminal-dedicated unicast BWP.

In some embodiments, the at least one MBS BWP is one MBS BWP, and an identifier of the MBS BWP is associated with an identifier of the active dedicated unicast BWP.

Certainly, in other embodiments of the present disclosure, the at least one MBS BWP may be a plurality of MBS BWPs.

In an implementation, the identifier of the one MBS BWP is identical with the identifier of the active dedicated unicast BWP.

In other words, each MBS BWP is associated with one dedicated unicast BWP, and the BWP ID of the MBS BWP and the BWP ID of the associated dedicated unicast BWP are the same. The terminal determines the associated MBS BWP according to the ID of the currently active dedicated unicast BWP. In some embodiments, in the present embodiment, if a value of a "Bandwidth part indicator" field in DCI received by the terminal is w, or a BWP with an ID w is activated by the RRC layer signaling received by the terminal, the terminal activates a terminal-dedicated unicast BWP with an ID w, and receives the common PDCCH, common PDSCH or SPS transmission in the associated MBS BWP.

In an implementation, a frequency domain size of the one MBS BWP is smaller than or equal to a frequency domain size of the active dedicated unicast BWP.

FIG. 8 and FIG. 9 are schematic diagrams of association relationships between a terminal-dedicated unicast BWP and an MBS BWP when available ID values of the MBS BWP and the terminal-dedicated unicast BWP are identical as provided by embodiments of the present disclosure. In an example, as shown in FIG. 8, the available ID values of the MBS BWP are the same as those of the terminal-dedicated unicast BWP. When IDs of the two BWPs are the same, the terminal considers that the two BWPs are associated with each other. In another example, as shown in FIG. 9, if the terminal is configured with a plurality of BWPs with the same ID, the terminal considers that there is an association relationship between the two BWPs with the same ID, and the BWP with a smaller frequency domain range is the MBS BWP, and the other one is the terminal-dedicated unicast BWP. If the two BWPs with the same ID have the same frequency domain range, the terminal may regard either of them as the MBS BWP, and the other one as the terminal-dedicated unicast BWP. In the present embodiment, the MBS BWP is not counted in the total number of terminal-dedicated BWPs.

In an implementation, the identifier of the one MBS BWP is different from the identifier of the active dedicated unicast BWP.

In other words, each MBS BWP has an independent BWP ID. In some embodiments, a BWP ID value range for the MBS BWP is different from a BWP ID value range for the terminal-dedicated unicast BWP. Any MBS BWP is associated with a terminal-dedicated unicast BWP.

FIG. 10 is a schematic diagram of an association relationship between a terminal-dedicated unicast BWP and an MBS BWP when available ID values of the MBS BWP and the terminal-dedicated unicast BWP are different as provided by embodiments of the present disclosure. As shown in FIG. 10, the terminal considers that the BWPs with ID values of 5, 6, 7, and 8 as MBS BWPs, and the MBS BWPs with the ID values of 5, 6, 7, and 8 are associated with the dedicated unicast BWPs with ID values of 1, 2, 3, and 4, respectively. In the present embodiment, the BWPs with ID values of 5, 6, 7 and 8 are not counted in the total number of the terminal-dedicated BWPs. In some embodiments, in the present embodiment, the terminal does not expect the value of the "Bandwidth part indicator" field in the received DCI to be greater than 4, that is, the terminal does not expect the value of the ID of the BWP activated by the received RRC layer signaling to be greater than 4.

In some embodiments, the method 200 may further include:

receiving configuration information of each of the at least one MBS BWP, the configuration information including at least one of: a start Physical Resource Block (PRB) of the MBS BWP, a number of PRBs of the MBS BWP, a PDSCH configuration on the MBS BWP, a PDCCH configuration on the MBS BWP, or a Semi-Persistent Scheduling (SPS) configuration on the MBS BWP.

In other words, the terminal device receives the configuration information of each of the at least one MBS BWP. Correspondingly, the network device transmits the configuration information of each of the at least one MBS BWP.

In an implementation, the configuration information for each MBS BWP includes at least the start PRB, the number of PRBs of the MBS BWP, the PDSCH configuration on the MBS BWP, the PDCCH configuration on the MBS BWP, and the SPS configuration on the MBS BWP, etc.

In some embodiments, S210 may include:

determining a frequency domain range of the at least one MBS BWP within the frequency domain range of the active dedicated unicast BWP, according to the start PRB and the number of PRBs of each of the at least one MBS BWP; and receiving the common PDCCH within the frequency domain range of the at least one MBS BWP, according to the PDCCH configuration corresponding to the at least one MBS BWP respectively. Based on this, S220 may include:

receiving the common PDSCH according to indication information in the common PDCCH and the PDSCH configuration corresponding to the at least one MBS BWP.

In other words, the terminal device determines the frequency domain range of the at least one MBS BWP within the frequency domain range of the active dedicated unicast BWP, according to the start PRB and the number of PRBs of each of the at least one MBS BWP; the terminal device receives the common PDCCH within the frequency domain range of the at least one MBS BWP, according to the PDCCH configuration corresponding to the at least one MBS BWP respectively; and the terminal device receives the common PDSCH according to indication information in the common PDCCH and the PDSCH configuration corresponding to the at least one MBS BWP. Accordingly, the network device determines the frequency domain range of the at least one MBS BWP within the frequency domain range of the active dedicated unicast BWP, according to the start PRBs and the number of PRBs of each of the at least one MBS BWP; the network device transmits the common PDCCH within the frequency domain range of the at least one MBS BWP, according to the PDCCH configuration corresponding to the at least one MBS BWP respectively; and the network device transmits the common PDSCH according to indication information in the common PDCCH and the PDSCH configuration corresponding to the at least one MBS BWP.

In some embodiments, the method 200 may further include:

receiving SPS activation and/or de-activation signaling, according to SPS configuration corresponding to the at least one MBS BWP; and performing a downlink transmission reception according to the SPS activation and/or de-activation signaling.

In other words, the terminal device receives the SPS activation and/or de-activation signaling, according to the SPS configuration corresponding to the at least one MBS BWP; and the terminal device performs the downlink transmission reception according to the SPS activation and/or de-activation signaling. Accordingly, the network device transmits the SPS activation and/or de-activation signaling, according to the SPS configuration corresponding to the at least one MBS BWP; and the network device performs the downlink transmission reception according to the SPS activation and/or de-activation signaling.

As an example, if the current dedicated unicast BWP of the terminal is w, and the terminal is configured with the MBS BWP corresponding to the dedicated unicast BWP w, the terminal device may determine the frequency domain range of the MBS BWP according to the start PRB and the number of PRBs of the MBS BWP; the terminal may receive the common PDCCH according to the PDCCH configuration (pdcch-Config) on the MBS BWP; the terminal may receive the common PDSCH according to the indication information in the common PDCCH and the PDSCH configuration (pdsch-Config) on the MBS BWP; the terminal may receive the SPS activation and/or de-activation signaling according to the SPS configuration (sps-Config) on the MBS BWP; and the terminal may perform the downlink transmission reception according to the SPS activation and/or de-activation signaling. In other words, related configurations required for receiving the common PDCCH, the common PDSCH, and the SPS downlink transmission may be provided for the terminal, and the BWP switching delay will not be introduced when the terminal needs to receive unicast.

In some embodiments, a maximum number of bits of common Downlink Control Information (DCI) carried in the common PDCCH is configured by a network device, or the maximum number of bits of the common DCI is predefined.

In an implementation, a number of bits of the common DCI is configured by Radio Resource Control (RRC) layer signaling.

In an implementation, the maximum number of bits of the common DCI is equal to 126 or 128.

As an example, the number of bits of the common DCI carried in the common PDCCH is configured by RRC signaling, and the maximum number of configurable bits is 126 bits. As another example, the number of bits of the common DCI carried in the common PDCCH is configured by RRC signaling, and the maximum number of configurable bits is 128 bits. In some embodiments, the CRC of the common PDCCH is scrambled by a Groupcast Radio Network Temporary Identifier (G-RNTI), and when the number of bits of different DCI that a terminal in a cell needs to detect is being calculated, the common DCI is not counted in the number of bits of the DCI scrambled by the C-RNTI. By configuring the number of bits of the common DCI, it may be guaranteed that the terminals receiving the common PDCCH ideally have the same number of bits of the common DCI, and the number of bits of the common DCI may be aligned with the number of bits of other DCI to avoid increasing the number of bits of different DCI that the terminal needs to detect.

Of course, the above values are only examples of the present disclosure, and should not be construed as limiting the present disclosure.

In some embodiments, the common PDCCH is transmitted in a Common Search Space (CSS).

In other words, the terminal device receives the common PDCCH according to the PDCCH configuration (pdcch-Config) within the frequency domain range of the at least one MBS BWP. Accordingly, the network device transmits the common PDCCH within the frequency domain range of the at least one MBS BWP according to the PDCCH configuration (pdcch-Config), and the common PDCCH is transmitted in the Common Search Space (CSS).

In an implementation, an index of the CSS is identical with an index of a User equipment specific Search Space (USS) configured to the terminal device.

In an implementation, the method 200 may further include:

when a number of times that the terminal device performs blind detection on the PDCCH in a certain time slot exceeds capability of the terminal device, determining that a priority of the CSS is identical with a priority of the USS.

In other words, when the number of times that the terminal device performs blind detection on the PDCCH in a certain time slot exceeds the capability of the terminal device, both the terminal device and the network device determine that the priority of the CSS is identical with the priority of the USS.

As an example, the index of the CSS is identical with the index (searchSpaceId) of the UE specific Search Space (USS) configured to the terminal device, and the terminal device may receive, in the USS, information indicating the PDCCH that is transmitted in the CFR for scheduling retransmission of the common PDSCH. If the number of times that the terminal performs blind detection on the PDCCH in a certain time slot exceeds the UE capability, the priority of the CSS is identical with to the priority of the USS when determining the receiving priority of all the spaces. By setting the index of the CSS, when the number of times that the terminal performs blind detection on the PDCCH exceeds the UE capability, and the priority of the CSS is lower, the terminal may not detect the PDCCH in the CSS, thereby ensuring the detection of PDCCH in other USS(es) with higher priority(ies).

In some embodiments, the index of the CSS is configured in the PDCCH configuration (pdcch-Config).

In an implementation, the method 200 may further include:

when the number of times that the terminal device performs blind detection on the PDCCH in a certain time slot exceeds capability of the terminal device, the priority of the CSS is determined according to the index of the CSS.

In other words, when the number of times that the terminal device performs blind detection on the PDCCH in a certain time slot exceeds capability of the terminal device, both the terminal device and the network device determine the priority of the CSS according to the index of the CSS.

As an example, the index of the CSS is configured separately in the PDCCH configuration (pdcch-Config). When the number of times that the terminal device performs blind detection on the PDCCH in a certain time slot exceeds the UE capability, the terminal device may determine the priority of the CSS according to the index of the CSS. By setting the index of the CSS, when the number of times that the terminal device performs blind detection on the PDCCH exceeds the UE capability, and the priority of the CSS is lower, the terminal may not detect the PDCCH in the CSS, thereby ensuring the detection of PDCCH in other USS(es) with higher priority(ies).

The present disclosure provides a method for a terminal to receive a common PDCCH and a common PDSCH in an NR MBS system. According to the method proposed in present disclosure, the terminal receives the terminal-dedicated RRC signaling to determine the configuration of CFR, where the configuration of the CFR is BWP, the BWP is associated with the terminal-dedicated unicast BWP, and the BWP used for the CFR is not used as an active BWP. With the method proposed in present disclosure, the BWP switching delay in the process of receiving MBS by the terminal may be avoided. In addition, the detection of the common PDCCH may be guaranteed without improving PDCCH detection capability of the terminal. Furthermore, the terminal receives the common PDCCH in the CSS configured on the CFR, and the priority of the CSS may be the same as that of the USS, or the priority of the CSS may be configured separately and determined according to the index of the CSS. By setting the index of the CSS, when the number of times the terminal device performs blind detection on the PDCCH exceeds the UE capability, and the priority of the CSS is lower, the terminal may not detect the PDCCH in the CSS, thereby ensuring the detection of PDCCH in other USS(es) with higher priority(ies). Moreover, the number of bits of the DCI carried in the common PDCCH may be configured as 126 bits or 128 bits by the RRC layer signaling. By configuring the number of bits of the common DCI, it may be guaranteed that the terminals receiving the common PDCCH ideally have the same number of bits of the common DCI, and the number of bits of the common DCI may be aligned with the number of bits of other DCI to avoid increasing the number of bits of different DCI that the terminal needs to detect.

It should be understood that the steps in the method on the network device side and the corresponding steps in the method on the terminal device side may refer to each other, and details thereof may be omitted to avoid repetition.

The present disclosure also provides a resource configuration method for a terminal to receive a broadcast service, so as to ensure that a terminal in a disconnected (RRC_IDLE/RRC_INACTIVE) state may receive the broadcast service. If the terminal is in the disconnected state and does not receive the broadcast service, when the Initial downlink BWP is not configured in the System Information Block (SIB) 1, the terminal only receive PDCCH and PDSCH within a frequency domain range indicated by a Control Resource Set (CORESET #0) associated with Type0-PDCCH search space, where the frequency domain range indicated by CORESET #0 is up to 96 Physical Resource Blocks (PRBs); while when the initial downlink BWP is configured in SIB1, the terminal will receive PDCCH and PDSCH within the frequency range indicated by the initial downlink BWP. When the terminal needs to receive the broadcast service, it needs to use a larger range of frequency domain resources than the frequency domain range indicated by CORESET #0 to transmit the broadcast service in order to ensure the data transmission rate of the broadcast service.

Based on this, the present disclosure provides a wireless communication method. When the initial downlink BWP is not included in SIB1, additional CFR is configured for broadcast service transmission, so as to ensure the data transmission rate of the broadcast service. Particularly, the method includes:

in a case where a System Information Block 1 (SIB1) specific to a current cell is not configured with an initial downlink Bandwidth Part (BWP), receiving a specific signaling transmitted by a network device. The specific signaling is used to determine a Common Frequency Resource (CFR) for a broadcast service. Accordingly, the network device transmits, to the terminal device, the specific signaling for determining a Common Frequency Resource (CFR) for the broadcast service, in the case where the SIB1 specific to the current cell is not configured with the initial downlink BWP.

The terminal device may determine additional CRF via the specific signaling, and transmit the broadcast service on the additional CRF, thereby ensuring the data transmission rate of the broadcast service.

In some embodiments, the specific signaling is used to configure a BWP dedicated to the broadcast service, and the frequency domain range of the BWP includes a frequency domain range indicated by a Control Resource Set (CORESET) associated with a Type #0 Physical Downlink Control Channel (PDCCH) search space (i.e., a frequency domain range indicated by CORESET #0), and the BWP is not greater than the bandwidth of the current carrier. In an implementation, a subcarrier spacing and a cyclic prefix of the BWP are identical with those in the configuration of the Coreset #0.

In some embodiments, the method further includes:

in a case where the SIB1 specific to the current cell is configured with the initial downlink BWP, receiving the broadcast service in a frequency domain range indicated by the initial downlink BWP.

In other words, the terminal may determine the Common Frequency Resource (CFR) for receiving the broadcast service in the following manner:

In a case where the downlink initial BWP is not configured in the SIB1 specific to the current cell, the terminal receives a specific signaling transmitted by the base station to determine the CFR of the broadcast service. In some embodiments, the specific signaling is used to configure the BWP dedicated to the broadcast service, and the frequency domain range of the BWP includes the frequency domain range indicated by the CORESET #0 and is not greater than the bandwidth of the current carrier. In addition, the subcarrier spacing and the cyclic prefix of the BWP dedicated to the broadcast service should be identical with those in a configuration of the Coreset #0. In a case where the initial downlink BWP is configured in the SIB1 specific to the current cell, the terminal receives the broadcast service within the frequency range indicated by the initial downlink BWP.

In some embodiments, the specific signaling may be carried by a certain broadcast message. Alternatively, the terminal device does not expect to receive, in one cell, both the initial downlink BWP configured by SIB1 and the CFR of the broadcast service configured by the specific signaling.

The preferred embodiments of the present disclosure have been described in detail above in conjunction with the accompanying drawings. However, the present disclosure is not limited to the specific details in the above embodiments. Within the scope of the technical concept of the present disclosure, various simple modifications may be made to the technical solutions of the present disclosure. These simple modifications all belong to the protection scope of the present disclosure. For example, various specific technical features described in the above specific implementations may be combined in any suitable manner if there is no contradiction. In order to avoid unnecessary repetition, the present disclosure no longer explains the various possible combinations. As another example, any combination of various implementations of the present disclosure may also be made, as long as they do not violate the idea of the present disclosure, which should also be regarded as the content disclosed in the present disclosure.

It should also be understood that in the various method embodiments of the present disclosure, the sequence numbers of the above-mentioned processes do not mean the order of execution that should be determined by their functions and internal logic, and should not be used to limit the implementations of the present disclosure. In addition, in the embodiments of the present disclosure, the terms "downlink (DL)" and "uplink (UL)" are used to indicate the transmission direction of signals or data, and "downlink (DL)" is used to indicate that the transmission direction of signals or data is a first direction from the station to the user equipment in the cell, and "uplink (UL)" is used to indicate that the transmission direction of signals or data is a second direction from the user equipment in the cell to the station. For example, "downlink signal" indicates that the signal transmission direction is the first direction. In addition, in the embodiments of the present disclosure, the term "and/or" herein just defines some association between associated objects, which means that there may be three relationships. For example, A and/or B may include three cases where there is only A, there are both A and B, and there is only B. In addition, the character "/" herein generally indicates that the contextual objects are in an "or" relationship.

The method embodiments of the present disclosure are described above in detail in conjunction with FIG. 1 to FIG. 10. Hereinafter, the device embodiments of the present disclosure will be described in detail in conjunction with FIG. 11 to FIG. 14.

FIG. 11 is a schematic block diagram of a terminal device 300 according to an embodiment of the present disclosure.

As shown in FIG. 11, the terminal device 300 may include:

a communication unit 310 configured to:

receive a common Physical Downlink Control Channel (PDCCH) on at least one Multimedia Broadcast Service Bandwidth Part (MBS BWP) associated with an active dedicated unicast BWP, the at least one MBS BWP being a Common Frequency Resource (CFR) for MBS, and a frequency domain range of each of the at least one MBS BWP being within a frequency domain range of the active dedicated unicast BWP; and receive a common Physical Downlink Shared Channel (PDSCH) scheduled by the common PDCCH.

In some embodiments, the terminal device is configured with at least one dedicated unicast BWP, each of the at least one dedicated unicast BWP is associated with one or more MBS BWPs, and the at least one dedicated unicast BWP includes the active dedicated unicast BWP.

In some embodiments, the MBS BWP associated with the at least one dedicated unicast BWP is not used as an active BWP; and/or the terminal device does not expect physical layer signaling and/or Radio Resource Control (RRC) layer signaling to activate the MBS BWP associated with the at least one dedicated unicast BWP.

In some embodiments, the MBS BWP associated with the at least one dedicated unicast BWP is not counted in a total number of BWPs configured to the terminal device.

In some embodiments, a subcarrier spacing and a cyclic prefix configured for the at least one MBS BWP are respectively identical with a subcarrier spacing and a cyclic prefix configured for the active dedicated unicast BWP.

In some embodiments, the at least one MBS BWP is one MBS BWP, and the identifier of the one MBS BWP is associated with the identifier of the activated dedicated unicast BWP.

In some embodiments, the identifier of the one MBS BWP is identical with the identifier of the active dedicated unicast BWP.

In some embodiments, a frequency domain size of the one MBS BWP is smaller than or equal to a frequency domain size of the active dedicated unicast BWP.

In some embodiments, the identifier of the one MBS BWP is different from the identifier of the active dedicated unicast BWP.

In some embodiments, the communication unit 310 is further configured to:

receive configuration information of each of the at least one MBS BWP, the configuration information including at least one of: a starting Physical Resource Block (PRB) of the MBS BWP, a number of PRBs of the MBS BWP, a PDSCH configuration on the MBS BWP, a PDCCH configuration on the MBS BWP, or a Semi-Persistent Scheduling (SPS) configuration on the MBS BWP.

In some embodiments, the communication unit 310 is particularly configured to:

determine a frequency domain range of the at least one MBS BWP within the frequency domain range of the active dedicated unicast BWP, according to the start PRB and the number of PRBs of each of the at least one MBS BWP;

receive the common PDCCH within the frequency domain range of the at least one MBS BWP, according to the PDCCH configuration corresponding to the at least one MBS BWP respectively; and receive the common PDSCH according to indication information in the common PDCCH and the PDSCH configuration corresponding to the at least one MBS BWP.

In some embodiments, the communication unit 310 is the communication unit is further configured to:

receive SPS activation and/or de-activation signaling, according to a SPS configuration corresponding to the at least one MBS BWP; and perform a downlink transmission reception according to the SPS activation and/or de-activation signaling.

In some embodiments, a maximum number of bits of common Downlink Control Information (DCI) carried in the common PDCCH is configured by a network device, or the maximum number of bits of the common DCI is predefined.

In some embodiments, a number of bits of the common DCI is configured by Radio Resource Control (RRC) layer signaling.

In some embodiments, the maximum number of bits of the common DCI is equal to 126 or 128.

In some embodiments, the common PDCCH is transmitted in a Common Search Space (CSS).

In some embodiments, an index of the CSS is identical with an index of a User equipment specific Search Space (USS) configured to the terminal device.

In some embodiments, the terminal device 300 further includes:

a processing unit configured to: when a number of times that the terminal device performs blind detection on the PDCCH in a certain time slot exceeds capability of the terminal device, determine that a priority of the CSS is identical with a priority of the USS.

In some embodiments, the index of the CSS is configured in the PDCCH configuration.

In some embodiments, the terminal device 300 further includes:

a processing unit configured to: when a number of times that the terminal device performs blind detection on the PDCCH in a certain time slot exceeds capability of the terminal device, determine a priority of the CSS according to the index of the CSS.

FIG. 12 is a schematic block diagram of a network device 400 according to an embodiment of the present disclosure.

As shown in FIG. 12, the network device 400 may include:

a communication unit 410 configured to:

transmit a common Physical Downlink Control Channel (PDCCH) on at least one Multimedia Broadcast Service Bandwidth Part (MBS BWP) associated with an active dedicated unicast BWP, the at least one MBS BWP being a Common Frequency Resource (CFR) for MBS, and a frequency domain range of each of the at least one MBS BWP being within a frequency domain range of the active dedicated unicast BWP; and transmit a common Physical Downlink Shared Channel (PDSCH) scheduled by the common PDCCH.

In some embodiments, the network device is used to configure a terminal device with at least one dedicated unicast BWP, each of the at least one dedicated unicast BWP is associated with one or more MBS BWPs, and the at least one dedicated unicast BWP includes the active dedicated unicast BWP.

In some embodiments, the MBS BWP associated with the at least one dedicated unicast BWP is not used as an active BWP; and/or the terminal device does not expect physical layer signaling and/or Radio Resource Control (RRC) layer signaling to activate the MBS BWP associated with the at least one dedicated unicast BWP.

In some embodiments, the MBS BWP associated with the at least one dedicated unicast BWP is not counted in a total number of BWPs configured to the terminal device.

In some embodiments, a subcarrier spacing and a cyclic prefix configured with the at least one MBS BWP are respectively identical with a subcarrier spacing and a cyclic prefix configured with the active dedicated unicast BWP.

In some embodiments, the at least one MBS BWP is one MBS BWP, and an identifier of the at least one MBS BWP is associated with an identifier of the active dedicated unicast BWP.

In some embodiments, the identifier of the one MBS BWP is identical with the identifier of the active dedicated unicast BWP.

In some embodiments, a frequency domain size of the one MBS BWP is smaller than or equal to a frequency domain size of the active dedicated unicast BWP.

In some embodiments, the identifier of the one MBS BWP is different from the identifier of the active dedicated unicast BWP.

In some embodiments, the communication unit 410 is further configured to:

transmit configuration information of each of the at least one MBS BWP, the configuration information including at least one of: a start Physical Resource Block (PRB) of the MBS BWP, a number of PRBs of the MBS BWP, a PDSCH configuration on the MBS BWP, a PDCCH configuration on the MBS BWP, or a Semi-Persistent Scheduling (SPS) configuration on the MBS BWP.

In some embodiments, the communication unit 410 is particularly configured to:

determine a frequency domain range of the at least one MBS BWP within the frequency domain range of the active dedicated unicast BWP, according to the start PRB and the number of PRBs of each of the at least one MBS BWP;

transmit the common PDCCH within the frequency domain range of the at least one MBS BWP, according to the PDCCH configuration corresponding to the at least one MBS BWP respectively; and transmit the common PDSCH according to indication information in the common PDCCH and the PDSCH configuration corresponding to the at least one MBS BWP.

In some embodiments, the communication unit 410 is further configured to:

transmit SPS activation and/or de-activation signaling, according to a SPS configuration corresponding to the at least one MBS BWP; and transmit a downlink transmission according to the SPS activation and/or de-activation signaling.

In some embodiments, a maximum number of bits of common Downlink Control Information (DCI) carried in the common PDCCH is configured by a network device, or the maximum number of bits of the common DCI is predefined.

In some embodiments, a number of bits of the common DCI is configured by Radio Resource Control (RRC) layer signaling.

In some embodiments, the maximum number of bits of the common DCI is equal to 126 or 128.

In some embodiments, the common PDCCH is transmitted in a Common Search Space (CSS).

In some embodiments, an index of the CSS is identical with an index of a User equipment specific Search Space (USS) configured to the terminal device.

In some embodiments, the network device 400 further includes:

a processing unit configured to: when a number of times that the terminal device performs blind detection on the PDCCH in a certain time slot exceeds capability of the terminal device, determine that a priority of the CSS is identical with a priority of the USS.

In some embodiments, the index of the CSS is configured in the PDCCH configuration.

In some embodiments, the network device 400 further includes:

a processing unit configured to: when a number of times that the terminal device performs blind detection on the PDCCH in a certain time slot exceeds capability of the terminal device, determine a priority of the CSS according to the index of the CSS.

It should be understood that the device embodiments and the method embodiments may correspond to each other, and similar descriptions may refer to the method embodiments. Specifically, the terminal device 300 shown in FIG. 11 may correspond to the corresponding entity in performing the method 200 of the embodiment of the present disclosure, and the foregoing and other operations and/or functions of each unit in the terminal device 300 are used for implementing the corresponding processes in respective steps of the method of FIG. 7; details thereof will not be repeated here for the sake of brevity. Similarly, the network device 400 shown in FIG. 12 may correspond to the corresponding entity in performing the method 200 of the embodiment of the present disclosure, and the aforementioned and other operations and/or functions of each unit in the network device 400 are respectively used for implementing the corresponding processes respective steps of the method of FIG. 7, details thereof will not be repeated here for the sake of brevity.

In addition, the present disclosure also provides a terminal device, including:

a receiving unit configured to: in a case where a System Information Block 1 (SIB1) specific to a current cell is not configured with an initial downlink Bandwidth Part (BWP), receive a specific signaling transmitted by a network device, the specific signaling being used to determine a Common Frequency Resource (CFR) for a broadcast service.

In some embodiments, the specific signaling is used to configure a BWP dedicated to the broadcast service, a frequency domain range of the BWP includes a frequency domain range indicated by a Control Resource Set CORESET #0, and the BWP is not greater than a bandwidth of a current carrier.

In some embodiments, a subcarrier spacing and a cyclic prefix of the BWP are identical with a subcarrier spacing and a cyclic prefix in a configuration of the Coreset #0.

In some embodiments, the receiving unit is further configured to:

in a case where the SIB1 specific to the current cell is configured with the initial downlink BWP, receive the broadcast service in a frequency domain range indicated by the initial downlink BWP.

In addition, the present disclosure also provides a network device, including:

a transmitting unit configured to: in a case where a System Information Block 1 (SIB1) specific to a current cell is not configured with an initial downlink Bandwidth Part (BWP), transmit, to a terminal device, a specific signaling for determining a Common Frequency Resource (CFR) for a broadcast service.

In some embodiments, the specific signaling is used to configure a BWP dedicated to the broadcast service, a frequency domain range of the BWP includes a frequency domain range indicated by a Control Resource Set CORESET #0, and the BWP is not greater than a bandwidth of a current carrier.

In some embodiments, a subcarrier spacing and a cyclic prefix of the BWP are identical with a subcarrier spacing and a cyclic prefix in a configuration of the Coreset #0.

In some embodiments, the transmitting unit is further configured to:

in a case where the SIB1 specific to the current cell is configured with the initial downlink BWP, receive the broadcast service in a frequency domain range indicated by the initial downlink BWP.

The above describes the communication device in the embodiment of the present disclosure from the perspective of functional modules with reference to the accompanying drawings. It should be understood that the functional modules may be implemented in the form of hardware, may also be implemented by instructions in the form of software, and may also be implemented by a combination of hardware and software modules. Specifically, each step of the method embodiments in the embodiments of the present disclosure may be completed by an integrated logic circuit of the hardware in the processor and/or instructions in the form of software. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

For example, the processing unit and the communication unit 310, 410 as mentioned above may be implemented by a processor and a transceiver, respectively.

FIG. 13 is a schematic structural diagram of a communication device 500 according to an embodiment of the present disclosure.

As shown in FIG. 13, the communication device 500 may include a processor 510.

The processor 510 may invoke and execute a computer program from the memory, to implement the methods in the embodiments of the present disclosure.

As shown in FIG. 13, the communication device 500 may further include a memory 520.

The memory 520 may store indication information, and may also store codes, instructions, etc. executed by the processor 510. The processor 510 may invoke and execute a computer program from the memory 520, to implement the methods in the embodiments of the present disclosure. The memory 520 may be an independent device separately from the processor 510, or may be integrated in the processor 510.

As shown in FIG. 13, the communication device 500 may further include a transceiver 530.

The processor 510 may be configured to control the transceiver 530 to communicate with other devices, in particular, may transmit information or data to other devices, or receive information or data transmitted by other devices.

The transceiver 530 may include a transmitter and a receiver. The transceiver 530 may further include one or more antennas.

It should be understood that various components in the communication device 500 are connected through a bus system, and the bus system includes not only a data bus, but also a power bus, a control bus, and a status signal bus.

It should also be understood that the communication device 500 may be the terminal device in the embodiments of the present disclosure, and the communication device 500 may implement the corresponding processes implemented by the terminal device in each method of the embodiment of the present disclosure. That is, the communication device 500 in the embodiment of the present disclosure may correspond to the terminal device 300, and may correspond to the corresponding entity performing the method 200, and details thereof will not be repeated here for the sake of brevity. Similarly, the communication device 500 may be the network device in the embodiments of the present disclosure, and the communication device 500 may implement the corresponding processes implemented by the network device in each method of the embodiment of the present disclosure. That is, the communication device 500 in the embodiment of the present disclosure may correspond to the network device 400, and may correspond to the corresponding entity performing the method 200, and details thereof will not be repeated here for the sake of brevity.

In addition, a chip is also provided in an embodiment of the present disclosure.

For example, a chip may be an integrated circuit chip that has signal processing capabilities and may implement or perform the methods, steps and logic block diagrams disclosed in the embodiments of the present disclosure. The chip may also be called a system level chip, a system chip, a chip system, or a system-on-chip, etc. Alternatively, the chip may be applied in various communication devices, to cause the communication device equipped with the chip to perform the methods, steps and logic block diagrams disclosed in the embodiments of the present disclosure.

Figure 14:
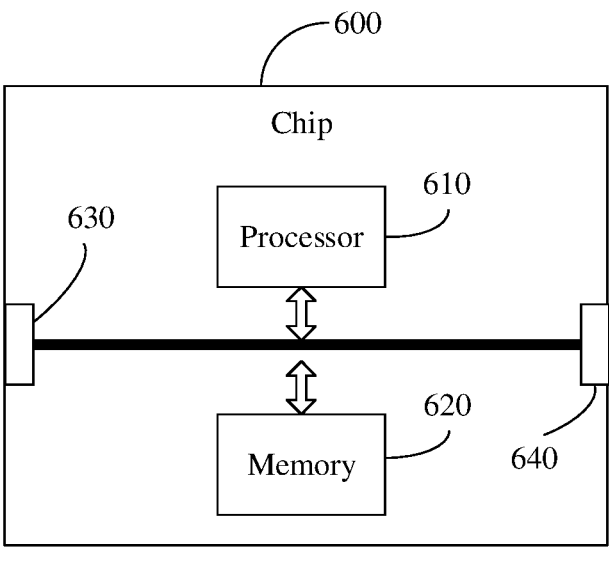
FIG. 14 is a schematic block diagram of a chip provided by an embodiment of the present disclosure.

FIG. 14 is a schematic structural diagram of a chip 600 according to an embodiment of the present disclosure.

As shown in FIG. 14, the chip 600 includes a processor 610.

The processor 610 may invoke and execute a computer program from the memory, to implement the methods in the embodiments of the present disclosure.

As shown in FIG. 14, the chip 600 may further include a memory 620.

The processor 610 may be configured to invoke and execute a computer program from the memory 620, to implement the method in the embodiment of the present disclosure. The memory 620 may store indication information, and may also store codes, instructions, etc. executed by the processor 610. The memory 620 may be an independent device separately from the processor 610, or may be integrated in the processor 610.

As shown in FIG. 14, the chip 600 may further include an input interface 630.

The processor 610 may be configured control the input interface 630 to communicate with other devices or chips, in particular, may obtain information or data transmitted by other devices or chips.

As shown in FIG. 14, the chip 600 may further include an output interface 640.

The processor 610 may be configured to control the output interface 640 to communicate with other devices or chips, in particular, may output information or data to other devices or chips.

It should be understood that the chip 600 may be applied in the network device in the embodiments of the present disclosure, and the chip may implement the corresponding processes implemented by the network device in the various methods of the embodiments of the present disclosure and the corresponding processes implemented by the terminal device in the various methods of the embodiments of the present disclosure, and details thereof will not be repeated here for the sake of brevity.

It should also be understood that the various components in the chip 600 are connected through a bus system, and the bus system includes not only a data bus, but also a power bus, a control bus, and a status signal bus.

The processors as mentioned above may include, but are not limited to:

a General-purpose processor, a Digital Signal Processor (DSP), an Application Specific Integrated Circuit (ASIC), a Field Programmable Gate Array (FPGA), or other programmable logic devices, discrete gates, or transistor logic devices, discrete hardware components, and so on.

The processor may be configured to implement or perform the methods, steps and logic block diagrams disclosed in the embodiments of the present disclosure. The steps of the methods disclosed in the embodiments of the present disclosure may be directly embodied as being performed and completed by a hardware decoding processor, or by a combination of hardware and software modules in the decoding processor. The software modules may be located in a known storage medium in the related art, such as random access memory, flash memory, read-only memory, programmable read-only memory, electrically erasable programmable memory, or register. The storage medium may be located in the memory, and the processor may be configured to read information from the memory and perform the steps of the above methods in combination with its hardware.

The memory as mentioned above includes but is not limited to:

a volatile memory and/or a non-volatile memory. The non-volatile memory may be a Read-Only Memory (ROM), a Programmable ROM (PROM), an Erasable PROM, (EPROM), an Electrically EPROM (EE-PROM), or a Flash. The volatile memory may be a Random Access Memory (RAM), which acts as an external cache. By way of illustration without any limitation, many forms of RAM are available, such as a Static RAM (SRAM), a Dynamic RAM (DRAM), a Synchronous DRAM (Synchronous DRAM, SDRAM), a Double Data Rate SDRAM (DDR SDRAM), an Enhanced SDRAM (ESDRAM), a synch link DRAM (SLDRAM), and a Direct Rambus RAM (DR RAM).

It should be noted that the memories as described herein are intended to include these and any other suitable types of memories.

Embodiments of the present disclosure also provide a computer-readable storage medium for storing computer programs. The computer-readable storage medium stores one or more programs, and the one or more programs include instructions that, when executed by a portable electronic device including a plurality of application programs, cause the portable electronic device to perform the method 200 of the illustrated example. Alternatively, the computer-readable storage medium may be applied in the network device in the embodiments of the present disclosure, and the computer program causes the computer to perform the corresponding processes implemented by the network device in the various methods of the embodiments of the present disclosure, and details thereof will not be repeated here for the sake of brevity. Alternatively, the computer-readable storage medium may be applied in the mobile terminal/terminal device in the embodiments of the present disclosure, and the computer program causes the computer to perform the corresponding processes implemented by the mobile terminal/terminal device in the various methods of the embodiments of the present disclosure, and details thereof will not be repeated here for the sake of brevity.

The embodiment of the present disclosure also provides a computer program product, including a computer program. Alternatively, the computer program product may be applied in the network device in the embodiments of the present disclosure, and the computer program causes the computer to execute the corresponding processes implemented by the network device in the methods of the embodiments of the present disclosure, and details thereof will not be repeated here for the sake of brevity. Alternatively, the computer program product may be applied in the mobile terminal/terminal device in the embodiments of the present disclosure, and the computer program causes the computer to execute the corresponding processes implemented by the mobile terminal/terminal device in the methods of the embodiments of the present disclosure, and details thereof will not be repeated here for the sake of brevity.

An embodiment of the present disclosure also provides a computer program. When the computer program is executed by the computer, the computer program causes the computer to perform the methods in the embodiments as shown in the method 200. Alternatively, the computer program may be applied in the network device in the embodiment of the present disclosure. When the computer program is executed by the computer, the computer program causes the computer to perform each method in the embodiment of the present disclosure implemented by the network device. For the sake of brevity, the corresponding process will not be repeated here. Alternatively, the computer program may be applied in the mobile terminal/terminal device in the embodiment of the present disclosure. When the computer program is executed by the computer, the computer program causes the computer to perform each method in the embodiment of the present disclosure implemented by the mobile terminal/terminal device. For the sake of brevity, the corresponding process will not be repeated here.

An embodiment of the present disclosure also provides a communication system, the communication system may include the above-mentioned terminal device and network device to form the communication system 100 as shown in FIG. 1, and details thereof will not be described here for brevity. It should be noted that the terms "system" and the like herein may also be referred to as "network management architecture" or "network system".

It should also be understood that the terms used in the embodiments of the present disclosure and the appended claims are only for the purpose of describing specific embodiments, and are not intended to limit the embodiments of the present disclosure. For example, the singular forms "a", "said", and "the" used in the embodiments of the present disclosure and the appended claims are also intended to include plural forms unless the context clearly indicates otherwise.

The skilled in the art may appreciate that the units and algorithm steps of the examples described in conjunction with the embodiments disclosed herein may be implemented by electronic hardware, or a combination of computer software and electronic hardware. Whether these functions are executed by hardware or software depends on the specific application and design constraints of the technical solution. Professionals and technicians may use different methods to implement the described functions for each specific application, but such implementation should not be regarded as going beyond the scope of the embodiments of the present disclosure. When the function is implemented in the form of a software functional unit and sold or used as a standalone product, it may be stored in a computer-readable storage medium. Based on this understanding, all or part of the technical solutions according to the present disclosure, or the part thereof that contributes to the prior art, may be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The above mentioned storage medium may include various mediums capable of storing program codes, such as a Universal Serial Bus flash drive, a mobile hard disk, an ROM, an RAM, a magnetic disk, or an optical disc.

The skilled in the art may also realize that, for convenience and brevity of description, the specific operating process of the above-described system, apparatus, and unit may refer to the corresponding process in the foregoing method embodiments, and details thereof will not be repeated here. In the several embodiments provided in the present disclosure, it should be understood that the disclosed systems, devices and methods may be implemented in other ways. For example, the division of units or modules or components in the above-described device embodiments is only a logical function division, and there may be other division approaches in actual implementations. For example, multiple units or modules or components may be combined or integrated to another system, or some units or modules or components may be ignored, or not implemented. For another example, the units/modules/components described above as separate/shown components may or may not be physically separated, that is, they may be located in one place, or may also be distributed to multiple network units. Part or all of the units/modules/components may be selected according to actual requirements to achieve the purpose of the embodiments of the present disclosure. Finally, it should be noted that the mutual coupling or direct coupling or communication connection shown or discussed above may be indirect coupling or communication connection of devices or units via some interfaces, and may be in electrical, mechanical or other forms.

While the specific embodiments of the present disclosure have been described above, the protection scope of the present disclosure is not limited to these embodiments. Various variants and alternatives may be easily conceived by any of those skilled in the art without departing from the technical scope of the present disclosure. Therefore, these variants and alternatives are to be encompassed by the protection scope of present disclosure as defined by the claims as attached.

What is claimed is:

1. A wireless communication method, comprising:
receiving a common Physical Downlink Control Channel (PDCCH) on at least one Multimedia Broadcast Service Bandwidth Part (MBS BWP) associated with an active dedicated unicast BWP, the at least one MBS

25

26
BWP being a Common Frequency Resource (CFR) for MBS, and each of the at least one MBS BWP having a frequency domain range within a frequency domain range of the active dedicated unicast BWP; and
receiving a common Physical Downlink Shared Channel (PDSCH) scheduled by the common PDCCH;
wherein a maximum number of bits of common Downlink Control Information (DCI) carried in the common PDCCH is predefined; and
a number of bits of the common DCI is configured via Radio Resource Control (RRC) layer signaling; wherein
the common PDCCH is transmitted in a Common Search Space (CSS); and
an index of the CSS is identical with an index of a user equipment specific Search Space (USS) configured to a terminal device;
wherein the method further comprises:
when a number of times that the terminal device performs blind detection on the PDCCH in a certain time slot exceeds capability of the terminal device, determining that a priority of the CSS is identical with a priority of the USS.

2. The method according to claim 1, wherein Cyclic Redundancy Check (CRC) of the common PDCCH is scrambled by a Groupcast Radio Network Temporary Identifier (G-RNTI), and when a number of bits of different DCI that need to be detected by a terminal in a cell is calculated, the common DCI is not counted in a number of bits of DCI scrambled by a Cell Radio Network Temporary Identifier (C-RNTI).

3. The method according to claim 1, wherein an index of the CSS is configured in PDCCH configuration.

4. The method according to claim 3, further comprising:
when a number of times that the terminal device performs blind detection on the PDCCH in a certain time slot exceeds capability of the terminal device, determining a priority of the CSS according to the index of the CSS.

5. The method according to claim 1, wherein the number of bits of the common DCI is aligned with a number of bits of other DCI.

6. The method according to claim 1, wherein the maximum number of bits of the common DCI is equal to 126 or 128.

7. A terminal device, comprising:
a processor, and
a memory having a computer program stored thereon,
wherein the processor is configured to invoked and executed the computer program stored in the memory, to enable the terminal device to perform:
receiving a common Physical Downlink Control Channel (PDCCH) on at least one Multimedia Broadcast Service Bandwidth Part (MBS BWP) associated with an active dedicated unicast BWP, the at least one MBS BWP being a Common Frequency Resource (CFR) for MBS, and each of the at least one MBS BWP having a frequency domain range within a frequency domain range of the active dedicated unicast BWP; and
receiving a common Physical Downlink Shared Channel (PDSCH) scheduled by the common PDCCH;
wherein a maximum number of bits of common Downlink Control Information (DCI) carried in the common PDCCH is predefined; and
a number of bits of the common DCI is configured via Radio Resource Control (RRC) layer signaling; wherein the common PDCCH is transmitted in a Common Search Space (CSS); and an index of the CSS is identical with an index of a user equipment specific Search Space (USS) configured to the terminal device;

wherein the processor is configured to invoked and executed the computer program stored in the memory, to enable the terminal device further to perform:

when a number of times that the terminal device performs blind detection on the PDCCH in a certain time slot exceeds capability of the terminal device, determining that a priority of the CSS is identical with a priority of the USS.

8. The terminal device according to claim 7, wherein Cyclic Redundancy Check (CRC) of the common PDCCH is scrambled by a Groupcast Radio Network Temporary Identifier (G-RNTI), and when a number of bits of different DCI that need to be detected by a terminal in a cell is calculated, the common DCI is not counted in a number of bits of DCI scrambled by a Cell Radio Network Temporary Identifier (C-RNTI).

9. The terminal device according to claim 7, wherein an index of the CSS is configured in PDCCH configuration.

10. The terminal device according to claim 9, wherein the processor is configured to invoked and executed the computer program stored in the memory, to enable the terminal device further to perform:

when a number of times that the terminal device performs blind detection on the PDCCH in a certain time slot exceeds capability of the terminal device, determining a priority of the CSS according to the index of the CSS.

11. The terminal device according to claim 7, wherein the number of bits of the common DCI is aligned with a number of bits of other DCI.

12. The terminal device according to claim 7, wherein the maximum number of bits of the common DCI is equal to 126 or 128.

13. A network device, comprising:

a processor, and a memory having a computer program stored thereon, wherein the processor is configured to invoke and execute the computer program stored in the memory, to enable the network device to perform:

transmitting a common Physical Downlink Control Channel (PDCCH) on at least one Multimedia Broadcast Service Bandwidth Part (MBS BWP) associated with an active dedicated unicast BWP, the at least one MBS BWP being a Common Frequency Resource (CFR) for MBS, and each of the at least one MBS BWP having a frequency domain range within a frequency domain range of the active dedicated unicast BWP; and transmitting a common Physical Downlink Shared Channel (PDSCH) scheduled by the common PDCCH;

wherein a maximum number of bits of common Downlink Control Information (DCI) carried in the common PDCCH is predefined; and a number of bits of the common DCI is configured via Radio Resource Control (RRC) layer signaling; wherein the common PDCCH is transmitted in a Common Search Space (CSS); and an index of the CSS is identical with an index of a user equipment specific Search Space (USS) configured to a terminal device;

wherein the processor is configured to invoke and execute the computer program stored in the memory, to enable the network device further to perform:

when a number of times that the terminal device performs blind detection on the PDCCH in a certain time slot exceeds capability of the terminal device, determining that a priority of the CSS is identical with a priority of the USS.

14. The network device according to claim 13, wherein Cyclic Redundancy Check (CRC) of the common PDCCH is scrambled by a Groupcast Radio Network Temporary Identifier (G-RNTI), and when a number of bits of different DCI that need to be detected by a terminal in a cell is calculated, the common DCI is not counted in a number of bits of DCI scrambled by a Cell Radio Network Temporary Identifier (C-RNTI).

15. The network device according to claim 13, wherein an index of the CSS is configured in PDCCH configuration.

16. The network device according to claim 15, wherein the processor is configured to invoke and execute the computer program stored in the memory, to enable the network device further to perform:

when a number of times that the terminal device performs blind detection on the PDCCH in a certain time slot exceeds capability of the terminal device, determining a priority of the CSS according to the index of the CSS.

17. The network device according to claim 13, wherein the number of bits of the common DCI is aligned with a number of bits of other DCI.

18. The network device according to claim 13, wherein the maximum number of bits of the common DCI is equal to 126 or 128.

* * * * *